Aug. 1, 1961     H. E. SCHULTZ     2,994,763
ARC STRAY CONTROL
Filed Dec. 10, 1959
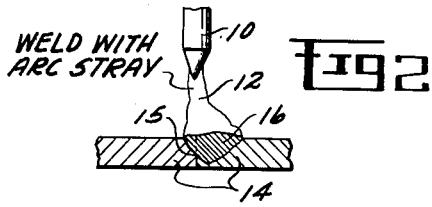
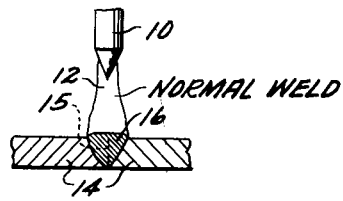
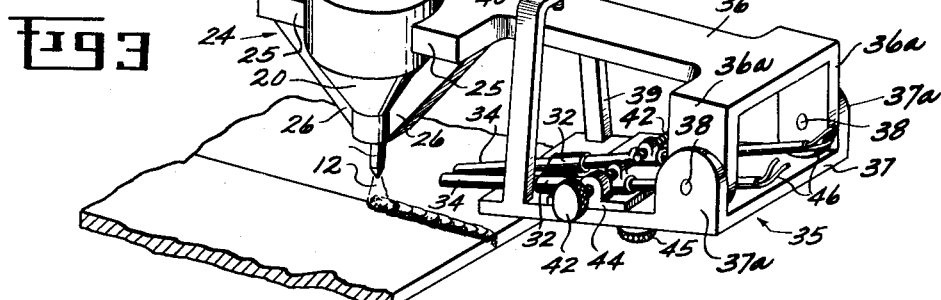
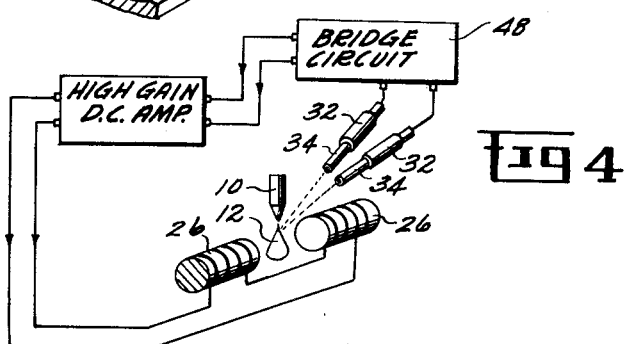
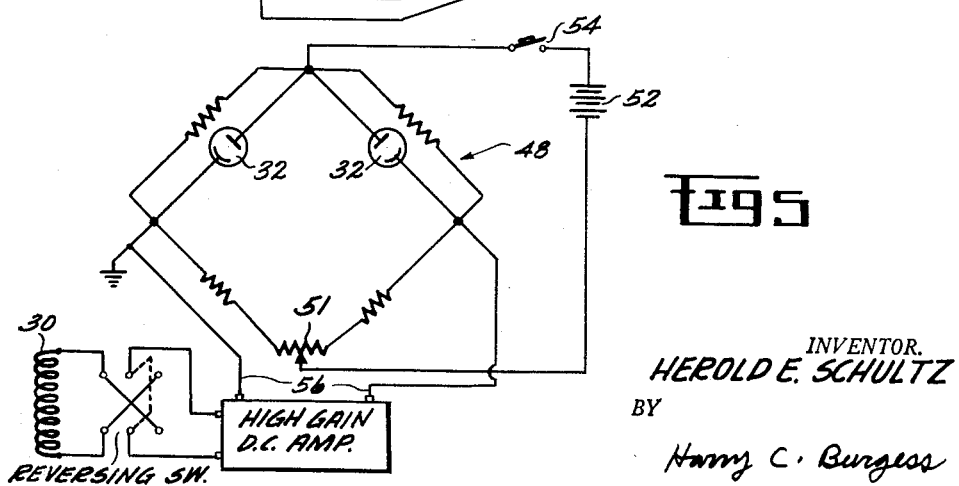
INVENTOR.
HEROLD E. SCHULTZ
BY
Harry C. Burgess
ATTORNEY—

United States Patent Office 2,994,763
Patented Aug. 1, 1961

2,994,763
ARC STRAY CONTROL
Herold E. Schultz, Milford, Ohio, assignor to General Electric Company, a corporation of New York
Filed Dec. 10, 1959, Ser. No. 858,663
6 Claims. (Cl. 219—123)

This invention relates to an electric arc welding machine and, more particularly, to means for preventing or controlling arc stray during the welding operation.

One of the problems connected with electric arc welding is the prevention of arc stray or drift. When arc drift does occur the result frequently is a poor weld due to incomplete penetration of fused metal along the abutting edges of the pieces being welded. Welding a long seam is often particularly troublesome in this respect, since the pieces are usually first tack-welded and during the finish weld the arc is likely to be deflected at the location of each tack weld. This deflection results in an uneven heat distribution and a consequent uneven penetration. Obviously, there is also a greater likelihood that any material defects in the pieces themselves will have a detrimental effect on the arc in the case of a long seam. Poor fit-up of parts and/or non-uniform fixturing also tend to enhance arc stray.

Assuming optimum conditions for the welding operation, however, i.e., correct arc length, sufficient voltage and amperage, an adequate inert gas supply, good fit-up of the pieces, uniform fixturing, and correct size and shape of the electrode, arc drift may still occur in automatic production-type welding. This is often the result of local magnetic effects in the vicinity of the arc. In addition, it is well known that any unevenness in the filler rod, if one is used, will cause an erratic movement of the welding arc. These, and other effects, such as shifting air currents or gases caused by ignition of a welding flux (if used) will tend to cause the arc to stray.

Accordingly, an object of the present invention is to provide an improved arc stray apparatus for use with electric arc welding equipment.

A further object of the invention is to provide an improved arc stray control apparatus for preventing or controlling arc stray or drift for use with automatic electric inert-arc welding equipment which will sense arc stray and correct it.

Briefly, my invention comprises an improved arc stray control apparatus for use with electric arc welding equipment, the apparatus including radiation responsive means, electrical signal generating means, and variable force field means energized by the signal generating means and operative to produce a force field to correct arc stray.

These and other objects and advantages of my invention will become more readily apparent when the following specification is read in conjunction with the drawings, of which:

FIG. 1 is an elevation, partly in cross-section, showing a normal weld; and

FIG. 2 is an elevation, partly in section, showing a weld in which arc stray has occurred; and FIG. 3 is a pictorial view of an embodiment of my improved arc stray control apparatus; and FIG. 4 is a block diagram of the apparatus shown in FIG. 2; and FIG. 5 is a schematic diagram of the apparatus showing the signal generating means in greater detail.

FIGS. 1 and 2 of the drawings have been included to emphasize the desirability of not allowing arc stray to go uncontrolled in a welding operation. FIG. 1 illustrates a weld as it appears when conditions are normal. FIG. 2, on the other hand, illustrates a weld in which arc stray has occurred. Shown at 10 in the drawings is an electrode, which may be constructed of tungsten, from which the arc stream or plasma 12 depends onto the material being welded, in this case, a pair of abutting metal plates 14—14. It will be seen that under ideal conditions the weld completely encompasses the juncture 15 of the welded plates. However, as shown in FIG. 2, when arc stray occurs the weld does not fully penetrate the depth of the juncture but rather is off to one side, the shaded area 16 illustrating the penetration and deposition of the fused material.

FIG. 3 depicts one embodiment of my improved arc stray control apparatus. In line with and directly above the juncture being welded is a typical electrode holder, indicated generally at 18. The holder 18 is constructed of a non-magnetic material, such as brass, and includes an enlarged nozzle portion 20 which may be threaded upon, or otherwise engaged with, a tube 22 leading to a current source (not shown) for the electrode 10.

In this particular embodiment, electrical arc deflection means is provided in the form of an electromagnet having a pair of specially-designed pole pieces, indicated generally at 24—24, adapted to surround the nozzle portion 20. These pole pieces include a pair of horizontally-disposed upper portions 25—25 and a pair of vertically-disposed extensions 26—26 projecting downwardly from the horizontal portions. The extensions are affixed (e.g., by brazing) to the non-magnetic nozzle portion 20 of the holder and are formed integrally or otherwise united electrically with the upper portions of their respective pole pieces. A cross piece 28 is provided to rigidly connect the upper portions 25—25 of the pole pieces and to support a coil 30. The combination of the pole pieces and the coil form an electromagnet which is adapted, as is hereinafter explained, to deflect the arc plasma 12 back along the line of weld when the coil is energized as a result of arc stray.

The radiation responsive means shown in the drawings comprises a pair of photoelectric cells 32—32 and a pair of sight tubes 34—34 which support the cells and collimate the radiation received from the arc. The cells are positioned, as described below, to sense a differential in radiation intensity emanating from the arc.

Supporting means for the radiation responsive units is indicated generally at 35. The supporting means includes an upper bracket portion 36, which may be in the form of an extension of one of the pole pieces, and a pair of downwardly-projecting ears 36a—36a at one end thereof. A platform 37 is provided for the photoelectric cells and sight tubes. The platform has a pair of ears 37a—37a on the upper surface thereof adapted to pivotally engage the first-mentioned pair of ears 36a—36a by means of a pair of swivel pins 38—38. A U-shaped collar 39 attached to the upper surface of the platform cooperates with a vertical adjustment 40 on the upper bracket portion 36 to pivot the platform to position the sight tubes vertically.

To provide horizontal and angular movement of the stray sensing cells, a swivel bracket 44 having a pair of horizontal adjustments 42—42 attached thereto is positioned on the platform 37. Suitable means, such as a screw 45, is provided to lock the swivel bracket in the desired position. By movement of the aforementioned vertical and horizontal adjustments and/or the swivel bracket, the sight tubes can be placed in a multiplicity of positions to insure that the photoelectric cells will be affected by even a slight change in the differential radiation intensity levels sensed by the cells as the arc strays either to left or right of center during the welding operation.

Another portion of my improved arc stray control apparatus consists of electrical signal generating means connected to the photoelectric cells by leads 46. The signal generating means preferably takes the form of a comparison network operated by the cells to produce an unbalance signal for energizing the coil 30. In the instant embodiment, the network is a bridge circuit, as shown in FIGS. 4 and 5. The polarity of the unbalance signal produced by the bridge is dependent on the direction in which the arc 12 has shifted. Also, depending on the type of welding operation and the amount of arc stray correction needed, a power amplifier may be provided to amplify the unbalance signal prior to its being transmitted to the coil 30.

A schematic diagram of the apparatus is seen in FIG. 5. Prior to operation of the system, a balance potentiometer 51 is adjusted to insure a balance or zero signal when the arc is correctly positioned over the weld line and the sight tubes lined up to provide for the differential response. (Use of a perfectly matched pair of photoelectric cells would, of course, achieve higher stability and reduce the need for bridge balancing when the arc is struck.) With the bridge connected to a power source 52 and the bridge excitation switch 54 in the "on" position, any change in the differential radiation intensity levels will affect the two photoelectric cells 32—32. The variation in levels generates the unbalance signal as described above, and the signal is transmitted through the bridge output 56, to the deflection coil 30. For manual operation a reversing switch may also be provided, as shown.

To explain how my arc stray control apparatus causes the arc to return to the normal position, it should be recalled that as an electric current passes through an object it sets up a magnetic field about the object. When a current-carrying object, or a medium such as the arc, is placed in and at right angles to a magnetic field existing between a pair of pole pieces, there is a tendency for the object (i.e., the arc) to move at right angles to the direction of the field. In my arc stray control system, one of the pole pieces 24—24 will be "north" and the other "south," depending on the polarity of the energizing unbalance signal supplied to the coil 30, and the resultant force field set up between the pieces will be parallel to the weld line. Since the arc 12 is perpendicular to that same line, when the arc cuts across the force field flux, it will tend to move perpendicular to the weld line in a direction dependent upon the polarity of the field. Thus, the amount of arc deflection will be dependent primarily on the presence and the strength of the electromagnetic force field, since the electrode current may be regarded as a constant, whereas the field is determined by, and varies with, the different radiation intensity levels sensed by the radiation responsive units. It will be clear to those skilled in the electrical arts, that th edeflection of the arc by the electromagnet described above follows the so-called "right-hand motor" rule.

It will be obvious from the above description that variations in the exact design of my arc stray control apparatus are possible within the spirit of the invention. For example, instead of photoelectric cells any suitable radiation responsive unit, such as a phototube, may be utilized in conjunction with other types of electrical signal generating means capable of performing the function of the bridge circuit. In addition, the exact design of the electromagnetic deflection coil may vary slightly, except that the coil should be able to exert sufficient force on the arc to deflect it an amount equivalent to that experienced in production type welding, e.g., from 1/16 to 1/8 of an inch off the center line. Finally, variations in the exact design of the support structure 35 and the adjusting means may be made to compensate for different weld widths and/or to accomplish miniaturization of the components, should this prove to be desirable.

In order to facilitate an understanding of my invention, reference has been made to an embodiment, with certain variations, for the purpose of illustration and specific language has been used to describe same. It will, nevertheless, be understood that no limitation of the scope of the invention is thereby intended, and that such further modifications and alternatives of the structure and function of the parts hereinabove described are contemplated as would be effected by those skilled in the art without the exercise of invention. It should also be pointed out that, in addition to the welding procedure described above (i.e., inert-arc welding with a non-consumable (tungsten) electrode), my invention works equally as well when, for example, a filler rod is used in combination with a tungsten electrode, or when the electrode itself is made consumable as is the case with other forms of welding, such as "carbon-arc" or "metal-arc" welding. In short, my improved arc stray control apparatus has proven to be a valuable aid in obtaining a better quality of welds on production machines.

Therefore, what I desire to claim as new and novel and secure by Letters Patent is:

1. For use with electric arc welding equipment, apparatus for controlling arc stray comprising: a pair of radiation responsive units so arranged with respect to the arc that the radiation intensity levels at the respective units vary differentially dependent on the direction of arc stray; electrical signal generating means operative under control of said units to produce an electrical control signal indicative of the direction of arc stray; and arc deflection means energized by said control signal to produce a force field so disposed with respect to the arc as to correct its stray.

2. For use with electric arc welding equipment, apparatus for controlling arc stray comprising: a pair of radiation responsive units disposed adjacent the arc and exposed to the radiation thereof, the radiation intensity levels at the respective units varying differentially dependent on the direction of arc stray; electrical signal generating means operative under control of said units to produce an electrical control signal indicative of the direction of arc stray; and electromagnet means energized by said electrical control signal to produce a force field so disposed with respect to the arc as to correct its stray.

3. For use with electric arc welding equipment, apparatus for controlling arc stray comprising: a pair of photoelectric cells so arranged with respect to the arc as to be exposed to radiation thereof, the radiation intensity levels at the respective cells varying differentially dependent on the direction of arc stray; a comparison network operatively connected to said cells and responsive to control thereby, said network producing an unbalance signal indicative of the direction of arc stray; and electromagnet means energized by said unbalance signal to produce a force field so disposed with respect to the arc as to correct its stray.

4. For use with electric arc welding equipment, apparatus for controlling arc stray comprising: a pair of photoelectric units of a type sensitive to radiation emanating from an electric arc; support means disposing said units adjacent the arc to expose the units to radiation thereof, said support means including a plurality of adjustments arranged to position said units so that the radiation intensity levels at the respective units will vary differentially dependent on the direction of arc stray; an electrical comparison network operative under control of said photoelectric units to produce an unbalance signal indicative of the direction of variation of the radiation intensity differential and thus indicative of the directon of arc stray; power amplifying means operative to amplify said unbalance signal; and electromagnet means energized by the amplified unbalance signal to produce a force field so disposed with respect to the arc as to correct its stray.

5. For use with electric arc welding equipment, apparatus for controlling arc stray comprising: a pair of photoelectric cells of a type sensitive to radiation emanating from an electric arc; radiation collimating means attached to said cells, said collimating means including a pair of sight tubes; support means cooperating with said sight tubes to dispose said cells adjacent the arc so as to be exposed to radiation thereof, said support means including a plurality of adjustments arranged to position said units so that the radiation intensity levels at the respective units will vary differentially dependent on the direction of arc stray; electrical signal generating means operative under control of said cells to produce an electrical control signal indicative of the direction of arc stray; and arc deflection means energized by said control signal to produce a force field so disposed with respect to the arc as to correct its stray.

6. For use with electric arc welding equipment, apparatus for controlling arc stray comprising: a pair of radiation responsive units; radiation collimating means attached to said units; support means cooperating with said collimating means to dispose said units adjacent the arc, said support means including a plurality of adjustments constructed and arranged to position said units so that the radiation intensity levels at the respective units will vary differentially dependent on the direction of arc stray; electrical signal generating means operative under control of said radiation responsive units to produce an electrical control signal indicative of the direction of variation of the radiation intensity differential and thus indicative of the direction of arc stray; power amplifying means operative to amplify said electrical control signal; and arc deflection means energized by said amplified control signal to produce a force field so disposed with respect to the arc as to correct its stray.

References Cited in the file of this patent

UNITED STATES PATENTS

| | | |
|---|---|---|
| 571,463 | Thomson | Nov. 17, 1896 |
| 1,854,536 | Wilson | Apr. 19, 1932 |
| 1,906,496 | Stine et al. | May 2, 1933 |
| 1,921,572 | Kinnard | Aug. 8, 1933 |
| 2,233,617 | Lamb | Mar. 4, 1941 |
| 2,469,664 | Murch | May 10, 1949 |
| 2,475,183 | Gibson | July 5, 1949 |
| 2,662,991 | Gretener | Dec. 15, 1953 |
| 2,694,129 | Yenni | Nov. 9, 1954 |
| 2,844,705 | Bowman et al. | July 22, 1958 |
| 2,945,626 | Vance et al. | July 19, 1960 |